United States Patent [19]

Oda et al.

[11] 4,218,506

[45] Aug. 19, 1980

[54] RECORDING MATERIAL AND METHOD FOR THE PRODUCTION OF THE SAME

[75] Inventors: Shinichi Oda; Shoji Aoyagi; Takio Kuroda; Eishun Tozaki, all of Hyogo, Japan

[73] Assignee: Kanzaki Paper Manufacturing Co., Ltd., Tokyo, Japan

[21] Appl. No.: 936,207

[22] Filed: Aug. 24, 1978

[30] Foreign Application Priority Data

Aug. 31, 1977 [JP] Japan .............................. 52-105381

Apr. 24, 1978 [JP] Japan .............................. 53-49663

[51] Int. Cl.$^2$ ........................ B32B 27/18; B41M 5/22

[52] U.S. Cl. .................................... 428/327; 252/316; 282/27.5; 427/151; 428/307; 428/914

[58] Field of Search ........................ 252/316; 427/151; 428/307, 914, 327

[56] References Cited

U.S. PATENT DOCUMENTS 3,789,015 1/1974 Matsukawa et al. ................ 252/316

3,855,146 12/1974 Saeki et al. .......................... 252/316

FOREIGN PATENT DOCUMENTS 2423830 12/1974 Fed. Rep. of Germany .......... 252/316

*Primary Examiner*—Richard D. Lovering

*Attorney, Agent, or Firm*—Morgan, Finnegan, Pine, Foley & Lee

[57] ABSTRACT

The recording material comprises a base sheet and a color former coating layer formed on a surface of the base sheet and the color former coating layer is formed by coating a surface of the base sheet with a coating composition comprising an aqueous dispersion of microcapsules each encapsulating a hydrophobic color former material therein and having a capsule wall of a gelated hydrophilic colloid material. The dispersion further includes (a) a hardener for the hydrophilic colloid material and (b) a water soluble alkali salt of a copolymer of at least one olefinic monocarboxylic acid with at least one monomer copolymerizable with the olefinic monocarboxylic acid.

12 Claims, No Drawings

RECORDING MATERIAL AND METHOD FOR THE PRODUCTION OF THE SAME

BACKGROUND OF THE INVENTION

This invention relates to recording material having a color former coating layer formed by coating on a surface of a base sheet a coating composition including microcapsules each encapsulating a hydrophobic material containing an electron donating organic chromogenic material and more particularly to an improvement of preventing undesirable smudging and greasing on such recording material. This invention also relates to a method for the production of such recording material.

Among recording materials there are well known pressure-sensitive copying papers and heat-sensitive recording papers which utilize the color developing reaction between electron donating organic chromogenic material (hereinafter referred to as "color former") and electron accepting acidic reactant material (hereinafter referred to as "acceptor"). In pressure-sensitive copying paper at least one of the color former and the acceptor is contained in microcapsules so as to be isolated from the other and they become into contact with each other by rupturing such microcapsules to develop a color. In a most typical type of pressure-sensitive copying paper minute oil droplets in which the color former is dispersed or dissolved are encapsulated and coated onto papers.

Usually the pressure sensitive copying system utilizing the above-mentioned pressure sensitive copying papers consists of three kinds of sheets such as top sheet, middle sheet and bottom sheet, wherein the top sheet is coated on the underside thereof with a composition consisting mainly of pressure rupturable microcapsules each enclosing an oil droplet containing a color former dissolved or dispersed therein, the middle sheet is coated on the upperside thereof with another composition consisting mainly of an acceptor and also is coated on the underside thereof with the composition of microcapsules containing an oil droplet in which a color former is dissolved or dispersed and the bottom sheet is coated on the upperside thereof with the composition of an acceptor.

The most typical method for making oil-containing microcapsules for the above mentioned purpose is to utilize the coacervation technique. For example, according to the disclosure in U.S. Pat. No. 2,800,457 oil-containing microcapsules are made by the following steps:

(1) A mixture of two different hydrophilic colloid sols in which oil droplets are dispersed is prepared. The mixture may be made by forming an aqueous sol of one colloid material, emulsifying the selected oil therein, and mixing the emulsion with an aqueous sol of another colloid material or the two sols may be made and mixed and the oil emulsified therein. The two colloid materials have opposite electric charges and at least one of them is gellable.

(2) Coacervation is caused by dilution and/or by adjusting the pH of the mixture to form and adhere a coacervate around each of the oil droplets.

(3) The coacervate around each of the oil droplets is gelled by cooling; and (4) The coacervate is further hardened by addition of a hardening agent and if necessary by adjusting the pH to an alkaline zone.

For the manufacture of pressure sensitive copying papers through the utilization of the above coacervation technique coating additives such as pulp powder, casein, starch and hydroxyethylcellulose and dyes for enhancing the whiteness such as fluorescent dyes, organic pigments and methyl violet are added to the coating composition. For preservation various fungicides, antiseptics and mold proofing agents such as sorbic acid, potassium sorbate, pentachlorophenol, chloramine T, Salicyclic acid, methylnaphthoquinone, butyl p-oxybenzoic acid, formaldehyde and glutaraldehyde may also be added to the coating composition. The coating composition is preferably preserved at a temperature below 20° C.

The pressure sensitive copying system particularly finds its usefulness in business form papers having printed forms applied by an offset printing, preferably by a wet offset printing. In case where the middle sheet of a business form having a color former coating on one side and an acceptor coating on the other side is wound into a roll after a form is printed on its one surface by a wet offset printing, undesirable smudges are often produced on the acceptor coating layer over its all area. This is considered due to the fact that microcapsules enclosing a color former are incidentally ruptured by printing pressure and the color former is transferred to the acceptor layer. In addition to this, in many cases the color former microcapsule coating layer of the top or middle sheet is greased or stained with printing ink. It is considered that various agents included in the coating layer such as protein, surface active agents and binders which may be transferred to the blanket surface and/or the printing roll surface would participate in staining the color former microcapsule layer with printing ink.

An attempt has been made to improve the pressure resistance of the microcapsules by adding binders such as polyvinyl alcohol, casein, starch, sodium alginate, carboxymethylcellulose, hydroxymethylcellulose, hydroxyethylcellulose. However, this attempt has not been able to substantially prevent the above-mentioned smudging and greasing.

The principal object of the invention is to provide an improved recording material having a color former microcapsule layer in which smudges and printing ink stains produced during a wet offset printing operation can be minimized.

Other objects and advantages of the invention will become apparent from the following description.

SUMMARY OF THE INVENTION

The recording material according to the invention comprises a base sheet and a color former coating layer formed on a surface of the base sheet. The color former coating layer includes microcapsules each encapsulating a hydrophobic color former material therein. The color former layer is formed by coating a surface of the base sheet with a coating composition comprising an aqueous dispersion of the microcapsules each having a capsule wall of a gelated hydrophilic colloid material, the dispersion further including (a) a hardener for said hydrophilic colloid material, and (b) a water soluble alkali salt of a copolymer of at least one olefinic monocarboxylic acid with at least one monomer copolymerizable with the olefinic monocarboxylic acid.

Preferably, the water soluble alkali salt of the copolymer used in the coating composition has a surface tension of at least 40 dyne/cm in a 1 weight % aqueous solution. Also preferably, the water soluble alkali salt of a copolymer is an alkali salt of a copolymer of at least one olefinic monocarboxylic acid with at least one acrylic or methacrylic monomer.

DETAILED DESCRIPTION OF THE INVENTION

The microcapsules each encapsulating a hydrophobic color former material therein may be produced by the known coacervation technique, for example, as disclosed in any of U.S. Pat. Nos. 2,800,457, 2,800,458 and Re. 24,899, Japanese Patent Publications Nos. 1,881 of 1963, 2,981 of 1963 and 43,547 of 1973, Japanese Laid-Open Patent Publication Nos. 140,376 of 1975 and 118,509 of 1976 and Japanese Patent Application No. 9,022 of 1977. Among the hydrophilic colloid materials utilizable for the coacervation technique there are included various natural and synthetic substances such as gelatin, casein, gum arabic, sodium alginate, carboxymethylcellulose, polyvinyl alcohol and methyl vinyl ether-maleic anhydride copolymer. The most preferred hydrophilic colloid material utilizable for the invention is gelatin.

The hydrophobic material encapsulated in each of the microcapsules may be any of conventional ones. For example, mineral oils such as petroleum, kerosene, and paraffin oil; animal oils such as fish oil and lard oil; vegetable oils such as soybean oil, castor oil, linseed oil, earth-nut oil and corn oil; synthetic oils such as alkyldiphenyl, biphenyl derivatives, naphthalene derivatives, alkylbenzene derivatives, cholesterol derivatives, phenoxyethanol, benzyl alcohol, aliphatic carboxylic acid ester e.g. adipic acid esters, aromatic carboxylic acid esters e.g. phthalic acid esters, tributylphosphate and the like may be used either solely or in combination.

For the manufacture of pressure sensitive copying papers at least one electron donating organic chromogenic material such as crystal violet lactone, malachite green lactone, benzoyl leuco methylene blue, rhodamine-B-lactam and fluoran is dissolved in the above mentioned hydrophobic material, if necessary, together with a light resistant material such as benzotriazole.

According to the invention an aqueous system comprising an aqueous solution of a hydrophilic colloid material is prepared. Oil droplets containing a color former material dissolved therein are dispersed in the aqueous solution. Coacervation is caused in the aqueous system at a temperature above the gelation point of the hydrophilic colloid material to form a coacervate suspension in which each of the oil droplets is surrounded by a coacervate of a hydrophilic colloid material. The coacervate suspension is then cooled to a temperature below the gelation point of the hydrophilic colloid material to form microcapsules each having a capsule wall of a gelated hydrophilic colloid material.

To the thus prepared microcapsule dispersion there are added a hardener for the hydrophilic colloid material and a water soluble alkali salt of a copolymer of at least one olefinic monocarboxylic acid with at least one monomer copolymerizable with said olefinic monocarboxylic acid. The hardener and the water soluble alkali salt of a copolymer described may be added to the microcapsule dispersion either simultaneously or one by one. The only requirement is that the hardener and the water soluble salt of a copolymer described co-exist in the microcapsule dispersion. Thus the water soluble alkali salt of a copolymer described may also be added even during or after the hardening step.

Among the useful hardener compounds there may be included: aldehydes such as formaldehyde, glyoxal, glutaraldehyde, mucochloric acid, glyceraldehyde, succinic dialdehyde, acrolein, dialdehyde starch, 2-methylglutaraldehyde, crotonaldehyde, tiglic aldehyde, citronellal, cinnamaldehyde, urea-formaldehyde resin, triazine-formaldehyde resin and polyamide-formaldehyde resin; diketones such as benzoquinone, cyclohexane-1,2-dione, cyclopentane-1,2-dione, diacetyl, 2,3-pentanedione, 2,5-hexanedione, and 2,5-hexenedione; epoxides such as ethylene glycol diglycidylether, polyethyleneglycol glycidylether, polyamide-epichlorohydrine resin, and triglycidylisocyanate; acid anhydrides such as 7,8-diphenyl-bicyclo(2,2,2)-7-octene-2,3,5,6-tetracarboxylic dianhydride, terephthaloyl chloride, 4,4'-diphenylmethanedisulfonylchloride; and acid chlorides. Any of these compounds may be used either solely or in combination. For the stability of the microcapsule dispersion aldehydes are preferably used as the hardener.

The amount of the hardener is not always limited to a special range. However, usually the amount of the hardener is within the range of 1 to 50 parts by weight, preferably, 3 to 30 parts by weight, with respect to 100 parts of the hydrophilic colloid material used.

The water soluble alkali salt of a copolymer described is an alkali salt of a copolymer of at least one olefinic monocarboxylic acid with at least one monomer copolymerizable with such olefinic monocarboxylic acid. Olefinic monocarboxylic acid means monocarboxylic acid having one double bond. Among those olefinic monocarboxylic acids there are included acrylic acid, methacrylic acid, crotonic acid, isocrotonic acid, vinyl acetic acid, allyl acetic acid, pyroterebic acid, β-benzoyl acrylic acid and the like. Acrylic acid, methacrylic acid and crotonic acid are preferably used.

Among monomers copolymerized with the above olefinic monocarboxylic acids, there are included alkyl esters or dialkyl esters of olefinic carboxylic acid in which the alkyl group has up to 18 carbon atoms, e.g., methyl acrylate, ethyl acrylate, propyl acrylate, n-butyl acrylate, iso-butyl acrylate, t-butyl acrylate, octyl acrylate, 2-ethylhexyl acrylate, decyl acrylate, stearyl acrylate, methyl methacrylate, ethyl methacrylate, propyl methacrylate, n-butyl methacrylate, isobutyl methacrylate, t-butyl methacrylate, dibutyl maleate and the like; acrylamide; methacrylamide; N-methylolacrylamide; N-methylolmethacrylamide; Cellosolve acrylates or methacrylates, e.g., ethyl Cellosolve acrylate, butyl Cellosolve acrylate, ethyl Cellosolve methacrylate and butyl Cellosolve methacrylate; acrylonitrile; methacrylonitrile; polyethylene glycol acrylate; polyethylene glycol methacrylate; glycidyl acrylates; glycidyl methacrylates, β-hydroxypropylacrylate; β-hydroxymethacrylate; alkyl vinyl ether or alkyl propenyl ether in which the alkyl group has up to 18 carbon atoms, e.g., n-butyl vinyl ether, 2-ethylhexyl vinyl ether and n-butyl propenyl ether; vinyl phenyl ketones; alkyl vinyl ketones in which the alkyl group has up to 18 carbon atoms; vinyl chloride; vinylidene chloride; vinyl acetate; butadiene; chloroprene; isoprene; vinylpyrrolidone and acrolein. Alkyl acrylates and methacrylates in which alkyl group has up to 18 carbon atoms, acrylonitrile, methacrylonitrile, acrylamide and methacrylamide are preferably used since they can effectively retain the oily material enclosed in microcapsules and accordingly production of smudges due to incidental development of color when microcapsules are ruptured by printing pressure during the offset printing operation immediately before the winding up operation of the paper sheet can be prevented to utmost extent.

The copolymer described is preferably a copolymer of 8 to 90 mol % of at least one olefinic monocarboxylic acid with 92 to 10 mol % of at least one monomer copolymerizable with the olefinic monocarboxylic acid. With olefinic monocarboxylic acid in an amount smaller than 8 mol % a desired water solubility can not be obtained. On the other hand, with olefinic monocarboxylic acid in an amount larger than 90 mol % the moisture absorption and redissolvability is undesirably increased.

The copolymerization of an olefinic monocarboxylic acid and a copolymerizable monomer may be carried out any known method utilizing various polymerization additives, such as polymerization initiator, e.g., potassium persulfate, ammonium persulfate, hydrogen peroxide, cumene hydroperoxide, ferrous ion, chromium ion, sulfite, hydroxylamine, hydrazine, benzoyl peroxide and azoisobutylonitrile; and emulsifier, e.g., sodium laurylsulfate, in a suitable medium such as water, methanol, ethanol, isopropanol, butanol, ethyl acetate, methyl ethyl ketone, toluene and xylene, solely or in combination.

The obtained copolymer is then neutralized by at least one alkali compound such as ammonia, amines such as ethylamine, propylamine, ethanolamine and propanolamine, sodium hydroxide, potassium hydroxide, magnesium oxide and calcium oxide to form a water soluble alkali salt. Preferably, the carboxyl group of olefinic monocarboxylic acid of the copolymer is substituted by ammonia and/or amine salts since this will increase the capsule wall strength and the microcapsule coating layer strength with the result of effectively preventing the pressure sensitive copying paper from being soiled or stained with smudges by incidental development of color during the offset printing operation. 1 to 95% of the carboxylic group of olefinic monocarboxylic acid of the copolymer may also be substituted into sodium or potassium salts for the purpose of improving the compatibility with the microcapsule dispersion. However, since if the carboxylic group is excessively substituted into sodium or potassium salts the paper sheet becomes easily stainable with printing ink during the offset printing operation, only 5 to 50% of carboxylic group is preferably substituted into sodium and/or potassium salts.

It is not always necessary to completely neutralize all the carboxylic groups of the copolymer with alkali. The alkali salt of the copolymer may have none substituted free carboxylic groups but in order to obtain a good water solubility the product should include at least 8 mol % of alkali salt of carboxylic acid.

We have found that water soluble alkali salts of the copolymer described having a surface tension of at least 40 dyne/cm, preferably, 45 to 72 dyne/cm, in a 1 weight % aqueous solution are particularly effective for preventing the recording material from being stained with printing ink.

The surface tension of the water soluble alkali salt of the copolymer described depends on the kind, composition and polymerization degree of the hydrophilic and hydrophobic monomers to be copolymerized, the kind and amount of the polymerization additives, the neutralization degree of the copolymer, the kind of alkali, the amount of unreacted monomers and inorganic salts, the temperature in the aqueous solution and pH of the solution of such alkali salt.

If the surface tension of the water soluble alkali salt of the copolymer described is smaller than 40 dyne/cm in its one weight % aqueous solution the surface activity of the water soluble alkali salt of the copolymer would become too large to obtain the desired results according to the invention.

The value of the surface tension described is given by measuring at 25° C. by the L. du Noüy's surface tension meter the surface tension of the sample solution three hours after its 1 weight % aqueous solution has been prepared and compensating the obtained value in comparison with the standard value of 72 dyne/cm for distilled water.

The water soluble alkali salts of the copolymer described may be used the form of aqueous solution having a concentration within the range of 5 to 50% by weight, a pH value within the range of 3 to 12 and a viscosity within the range of 5 to 100,000 cps. From the viewpoint of the coating flow property such water soluble alkali salts of the copolymer described as those having a higher polymerization degree corresponding to a viscosity of at least 1000 cps in a 20% by weight solution and a pH value of 8 to 10 are preferred. The alkali salts of the copolymer of this kind are also preferred since a good greasing resistance can be obtained.

There is no strict limitation about the amount of the alkali salt of the copolymer described. Usually it is added to the microcapsule dispersion in an amount of 0.5 to 50 parts by weight, preferably, 1 to 30 parts by weight, with respect to 100 parts by weight of the hydrophobic material in the microcapsules. In order to improve the stability, flow property and adhesive property various additives may be added to the microcapsule dispersion. Among those additives there may be included binders such as starch, casein and polyvinyl alcohol, so called "stilt agent" such as pulp powder and raw starch powder and dyes. The thus prepared microcapsule coating composition is applied to a surface of a base sheet such as natural paper, synthetic paper or synthetic film using a conventional coater and then dried. There is no strict limitation for the coating amount. Usually, the coating composition may be applied on a base sheet in an amount of 1 to 15 $g/m^2$, preferably 2 to 8 $g/m^2$, on dry basis.

In the pressure sensitive copying system which consists of a combination of a top sheet and a bottom sheet, or a combination of a top sheet, at least one middle sheet and a bottom sheet, the above described coating composition including the color former microcapsules is applied to the underside of each of the top sheet and the middle sheet. To the upper side of each of the middle sheet and the bottom sheet another coating composition including an acceptor is applied.

In another pressure sensitive copying system known as the "self contained" system, both the above described color former microcapsule coating composition and the acceptor are applied to one surface of the same sheet.

As the acceptors there are known various inorganic acidic compounds such as acidic clay, activated clay, attapulgite, silica and aluminum silicate, various organic acidic compounds such as phenols, phenolic polymers, aromatic carboxylic acids and polyvalent metal salts thereof, e.g., as disclosed in Japanese Patent Publications Nos. 10,856 of 1974 and 25,174 of 1976.

The utilization of the above described water soluble alkali salts of the specified copolymers enables the color former microcapsule coating layer to be unexpectedly and remarkably strengthened with the results of improving the moisture resistance, the microcapsule core material retainability and the mechanical strength of the microcapsules. The microcapsule coating layer formed according to the invention no longer suffers from the trouble of greasing with printing ink when a wet offset printing is applied on the coating layer. The middle sheet which is coated at its one surface with the above described microcapsule composition and at its other surface with the acceptor composition is effectively prevented from being smudged by incidental color development on its acceptor coating layer when wound into a roll after an offset printing and from the trouble caused by extraction of the oily core material of the microcapsules by a volatile solvent included in printing ink when the paper is wound up before the printing ink is completely dried.

PREFERRED EMBODIMENTS OF THE INVENTION

The following examples serve to illustrate the invention in more detail although the invention is not limited to the examples. Unless otherwise indicated, parts and % signify parts by weight and % by weight, respectively.

Examples 1 to 10 and Controls 1 to 6

Preparation of acceptor coated paper 70 parts of zinc 3,5-di-α-methylbenzylsalicylate was mixed with 30 parts of styrene-α-methylstyrene copolymer by melting in an extruder heated at 150° C. The resultant mixture was cooled at room temperature and pulverized to obtain an acceptor. 20 parts of the thus obtained acceptor, 25 parts of zinc oxide, 30 parts of aluminum hydroxide and 25 parts of activated clay were dispersed in an aqueous solution comprising 20 parts of 10% aqueous solution of polyvinyl alcohol and 5 parts of 20% aqueous solution of sodium polyacrylate and 375 parts of water. The dispersion was further treated in a sand grinder. 40 parts of 20% aqueous solution of oxidized starch and 30 parts of carboxylated styrene-butadiene copolymer latex (solid content: 48%) were added to this dispersion to prepare an acceptor coating composition.

The acceptor coating composition was coated on a surface of paper of 40 $g/m^2$ in an amount of 6 $g/m^2$ on dry basis by an air-knife coater and the coated paper was calendered to obtain an acceptor coated paper.

Preparation of a capsule dispersion A 30 parts of an acid treated gelatin was added to 270 parts of water and allowed to stand for one hour. Then 200 parts of water was added to the resultant aqueous system and the aqueous system was heated to 60° C. to obtain a gelatin solution. On the other hand, 3 parts of crystal violet lactone and 1 part of benzyl leuco methylene blue were dissolved in 100 parts of diisopropylnaphthalene. The obtained oily material was added to the above gelatin solution and emulsified with stirring to form oil droplets having an average particle size of 5 microns. To the emulsion, 300 parts of 10% aqueous solution of gum arabic was added and then 200 parts of water was added. The pH of the obtained aqueous system was adjusted to 4.1 with acetic acid to form a coacervate film around each of the oil droplets. The aqueous system was cooled to 10° C. with vigorous stirring to gelate the coacervate and then 5 parts of 50% aqueous solution of glutaraldehyde was added to it. The pH of the system was adjusted to 9.5. Then the system was stirred for ten hours to obtain a capsule dispersion. Most of the capsules were mono-nucleus capsule.

Preparation of capsule dispersion B 65 parts of an acid treated gelatin having an isoelectric point of 8.0 was added to 585 parts of water. The aqueous mixture was allowed to stand for one hour at 10° C. and then heated at 60° C. to prepare a gelatin solution.

On the other hand, 5.2 parts of crystal violet lactone and 2.6 parts of benzoyl leuco methylene blue were dissolved in a mixed oil of 78 parts of kerosene with 182 parts of isopropyl naphthalene. The oily mixture was heated at 60° C. and then added to the above gelatin solution. The resultant mixture was emulsified with a homomixer to form oil droplets having an average particle size of 3.0 microns. 1300 parts of warm water at 55° C. was added to the obtained emulsion and then 130 parts of 5% aqueous solution of carboxymethylcellulose having an average polymerization degree of 160 and a substitution degree of 0.6 (corresponding to 10% based on the weight of gelatin) was added to it. The pH of the aqueous system was adjusted with 10% sodium hydroxide solution to 5.4 under stirring. Then the aqueous system was cooled to 10° C. with stirring. The particle size distribution of the obtained capsules was measured by Coulter Counter. They were multi-nucleus capsules having an average particle size of 8.2 microns.

Further, 13 parts of 50% aqueous solution of glutaraldehyde was added to the aqueous system maintained at 10° C. with stirring. The pH of the aqueous system was adjusted to 6.0 with 10% sodium hydroxide to obtain a capsule dispersion.

Preparation of capsule dispersion C

An oily solution of 100 parts of alkylbiphenyl and 3 parts of crystal violet lactone was dispersed at 50° C. in an aqueous solution comprising 25 parts of acid treated gelatin having an isoelectric point of 8.5 and 250 parts of water to prepare an emulsion in which oil droplets have an average particle size of 3 microns. To the emulsion, an aqueous solution consisting of 25 parts of gum arabic and 250 parts of water was added and then 14 parts of 5% aqueous solution of polyvinylmethylether-maleic anhydride copolymer and 1770 parts of water were added. The aqueous system was mixed with stirring at 45° C. and the pH of it was adjusted to 4.2 by slowly adding 10% aqueous solution of acetic acid. The aqueous system was cooled to 10° C. and mixed with 25 parts of 10% formaldehyde. Then the pH of the aqueous system was adjusted to 10 with 5% aqueous solution of sodium hydroxide to prepare a microcapsule dispersion.

The microcapsules were multi-nucleus capsules having an average particle size of 9 microns.

Preparation of capsule-coated paper

To each of the above capsule dispersions, alkali salts of copolymer and various additives were added to prepare 16 capsule coating compositions as indicated in Tables 1-1 and 1-2.

In Example 5, alkali salts of copolymer were added simultaneously with glutaraldehyde as a hardener to capsule dispersion B. In Control 1, dispersing the alkali salt of copolymer was too difficult to prepare a capsule coating dispersion. In Control 5, any alkali salt of copolymer was not used. In Control 6, there was used capsule dispersion B' prepared by the same method for preparing capsule dispersion B except that the addition of glutaraldehyde and the adjustment of the pH of the system with an aqueous solution of sodium hydroxide were not carried out.

Each of the obtained sixteen capsule coating compositions was coated on the bare surface of the above acceptor coated paper in an amount of 5 g/m$^2$ on dry basis by an air-knife coater to prepare a rolled middle sheet with a width of 394 mm and a length of 2000 m.

Examination for the obtained middle sheet

The characteristics of the obtained middle sheet were measured by the following tests.

1. Test for greasing resistance

Rule was printed on the capsule coated surface of the middle sheet for 1000 m with a business form printing machine (17 BH manufactured by AKIRA Seisakusho, Japan) according to wet-offset printing process in the following conditions.

Ink: New Champion Red (manufactured by Dainippon Ink and Chemicals Inc., Japan)
Damping Water: Tap Water
Tension: 200 g/cm
Printing Speed: 100 m/min.

The greasing resistance was measured in terms of the printing length (m) in which the occurrence of greasing became visible.

2. Test for smudging resistance

The acceptor coated surface of the middle sheet was printed with a business form printing machine (17 BH manufactured by AKIRA Seisakusho, Japan) in the manner of a wet-offset printing process to obtain a roll of 300 m printed paper. After aging the roll at room temperature under atmosphere for 48 hours, the smudge of the acceptor coated surface at about 100 m from the core was examined with visual observation.

The evaluation of the smudge is shown according to the following marks:

◎: Any smudge was not present.
○: A few smudges were observed.
X: Smudges were observed.
XX: Smudges were observed on the whole surface.

The printing conditions were as follows:

Ink: New Champion Red (manufactured by Dainippon Ink and Chemicals Inc., Japan)
Damping Water: 3% aqueous solution of H liquid for PS Plate (EU-1 manufactured by Fuji Photo Film Co. Co., Ltd., Japan)
Tension: 400 g/cm
Printing Speed: 100 m/min.

The test results are shown in Table 1-2.

In Table 1-1 the neutralizing rate is shown in terms of the rate of the carboxyl group neutralized with NaOH, KOH, $NH_4OH$ or amine (propanolamine) per whole carboxyl group in the used copolymer. In Table 1-2, the amount of alkali salts of copolymer is indicated in parts per 100 parts of the hydrophobic material contained in microcapsules. In additives, raw starch is a classified wheaten starch granule having an average particle size of 20 to 30 microns and oxidized starch is a starch paste consisting of 20% aqueous solution. Hydroxyethylcellulose and casein are used in the form of aqueous solution. The amount of these additives is indicated in dry parts.

Examples 11 to 20 and Controls 7 to 12.

It was clarified in these examples and controls that the greasing resistance was effectively improved by using water soluble copolymer having a surface tension of more than 40 dyne/cm in a 1% aqueous solution.

Acceptor coated paper and capsule dispersions were prepared in the same manner as in Examples 1 to 10. To the capsule dispersions alkali salts of copolymer and various additives were added as indicated in Table 2-1 and 2-2 to obtain sixteen capsule coating compositions. In Example 15 alkali salts of copolymer were added simultaneously with glutaraldehyde as a hardener to capsule dispersion B. Each of the obtained sixteen capsule coating compositions was coated on the bare surface of the above acceptor coated paper in an amount of 5 g/m$^2$ on dry basis by an air-knife coater to prepare a rolled middle sheet with a width of 394 mm and a length of 2000 m.

The greasing resistance of the obtained middle sheet was examined in the following test.

Test for greasing resistance

Rule was printed on the capsule coated surface of the middle sheet for 1000 m with a business form printing machine (17 BH manufactured by AKIRA Seisakusho, Japan) according to a wet-offset printing process in the following conditions:

Ink: New Champion Red (manufactured by Dainippon Ink and Chemicals, Inc., Japan)
Compound: 10 parts of CP compound (manufactured by Dainippon Ink and Chemicals Inc., Japan) was added to 100 parts of ink.
Damping Water: 0.5% aqueous solution of H liquid for PS Plate (EU-1 manufactured by Fuji Photo Film Co., Ltd., Japan)
Tension: 200 g/cm
Printing Speed: 100 m/min.

The greasing resistance was measured in terms of the printing length (m) in which the occurrence of greasing became visible. The test results are shown in Table 2-2.

This test was carried out to known the influence of the surface tension of a water soluble copolymer on the greasing resistance. Accordingly, the test conditions were selected of more easily growing greasing than those in Examples 1 to 10 and Controls 1 to 6.

In Table 2-1, the neutralizing rate is shown in terms of the rate of the carboxyl group neutralized with NaOH, KOH, $NH_4OH$, amine (propanolamine), CaO or MgO per whole carboxyl group in the used copolymer. In Table 2-2 the amount of alkali salts of copolymer is indicated in parts per 100 parts of hydrophobic materials contained in microcapsules. In additives, raw starch is a classified wheaten starch granule having an average particle size of 20 to 30 microns and oxidized starch is a starch paste consisting of 20% aqueous solution. Hydroxyethylcellulose and casein are used in the form of an aqueous solution. The amount of these additives is indicated in dry parts.

TABLE 1-1.

| | Capsule Dispersion | Alkali Salts of Copolymer: Monomer Composition (mol %): Olefinic Mono-Carboxylic Acid | | Other Vinyl Monomers | | | | Neutralizing Rate (%): NaOH | KOH | NH$_4$OH | Amine |
|---|---|---|---|---|---|---|---|---|---|---|---|
| Examples | | | | | | | | | | | |
| 1 | A | Methacrylic Acid 60 | | Butyl Methacrylate 40 | | | | 10 | | 90 | |
| 2 | B | Methacrylic Acid 20 | | Butyl Methacrylate 50 | Methyl Methacrylate 30 | | | | | 100 | |
| 3 | C | Methacrylic Acid 10 | | Acrylamide 60 | Acrylonitrile 30 | | | | 20 | 80 | |
| 4 | B | Acrylic Acid 20 | Crotonic Acid 20 | Methyl Methacrylate 40 | Octyl Acrylate 20 | | | | 60 | 30 | |
| 5 | B | Acrylic Acid 80 | | Methyl Methacrylate 20 | | | | 80 | | 20 | |
| 6 | B | Acrylic Acid 40 | | Ethyl Acrylate 30 | Vinyl Acetate 15 | Methyl Methacrylate 10 | Vinyl Phenyl Ketone 5 | 10 | | 80 | |
| 7 | A | Acrylic Acid 20 | | Acrylonitrile 20 | Acrylamide 40 | N-Methylol Acrylamide 20 | | 20 | | 70 | |
| 8 | A | Methacrylic Acid 40 | | Methyl Methacrylate 30 | 2-Hydroxy Propyl Methacrylate 30 | | | 10 | | 50 | |
| 9 | A | Methacrylic Acid 60 | | Butyl Acrylate 40 | | | | 10 | | 50 | 40 |
| 10 | B | Methacrylic Acid 40 | Acrylic Acid 20 | Butyl Methacrylate 40 | | | | 10 | | 90 | |
| Controls | | | | | | | | | | | |
| 1 | A | Methacrylic Acid 5 | | Ethyl Acrylate 55 | Methyl Methacrylate 40 | | | | | 100 | |
| 2 | A | Acrylic Acid 30 | | Styrene 40 | Methyl Methacrylate 30 | | | 10 | | 90 | |
| 3 | A | Acrylic Acid 100 | | | | | | 100 | | | |
| 4 | B | Acrylic Acid 100 | | | | | | | | 100 | |
| 5 | B | — | | — | | | | | | | |
| 6 | B' | Methacrylic Acid 40 | Acrylic Acid 20 | Butyl Methacrylate 40 | | | | 10 | | 90 | |

TABLE 1-2

| | Amount of Alkali Salts of Copolymer (parts) | Additive (parts) | | | | | | | | Test Results: Greasing Resistance | Smudging Resistance |
|---|---|---|---|---|---|---|---|---|---|---|---|
| Examples | | | | | | | | | | | |
| 1 | 5 | Pulp Powder | 30 | | | | | | | 1000m< | ◎ |
| 2 | 3 | Pulp Powder | 30 | Oxidized Starch | 10 | Hydroxyethyl-cellulose | 4 | | | 1000m< | ○ |
| 3 | 5 | Pulp Powder | 15 | raw starch | 5 | Oxidized Starch | 20 | | | 1000m< | ○ |
| 4 | 5 | Pulp Powder | 30 | Oxidized Starch | 15 | Hydroxyethyl-cellulose | 2 | | | 500m | ○ |
| 5 | 10 | Pulp Powder | 30 | Oxidized Starch | 15 | Hydroxyethyl-cellulose | 2 | | | 500m | ○ |
| 6 | 5 | Pulp Powder | 30 | Oxidized Starch | 15 | Hydroxethyl-cellulose | 2 | | | 1000m< | ◎ |
| 7 | 5 | Pulp Powder | 30 | Oxidized Starch | 15 | Hydroxyethyl-cellulose | 2 | | | 1000m | ◎ |
| 8 | 3 | Pulp Powder | 30 | Oxidized starch | 15 | Hydroxyethyl-cellulose | 2 | | | 1000m | ○ |
| 9 | 5 | Pulp Powder | 30 | Oxidized starch | 15 | Hydroxyethyl-cellulose | 2 | | | 1000m< | ○ |
| 10 | 5 | Pulp Powder | 30 | Oxidized Starch | 15 | Hydroxyethyl-cellulose | 1 | Casein | 1 | 1000m< | ◎ |

TABLE 1-2-continued

| | Amount of Alkali Salts of Copolymer (parts) | Additive (parts) | | | | | | | | Test Results Greasing Resistance | Test Results Smudging Resistance |
|---|---|---|---|---|---|---|---|---|---|---|---|
| Controls | | | | | | | | | | | |
| 1 | 5 | Pulp Powder | 30 | Oxidized Starch | 15 | Hydroxyethyl-cellulose | 2 | | | — | — |
| 2 | 10 | Pulp Powder | 30 | Oxidized Starch | 15 | Hydroxyethyl-cellulose | 2 | | | 500m | XX |
| 3 | 10 | Pulp Powder | 30 | Oxidized Starch | 15 | Hydroxyethyl-cellulose | 2 | | | 100m> | X |
| 4 | 10 | Pulp Powder | 30 | Oxidized Starch | 15 | Hydroxyethyl-cellulose | 2 | | | 500m | X |
| 5 | — | Pulp Powder | 30 | Oxidized Starch | 15 | Hydroxyethyl-cellulose | 2 | Casein | 5 | 100m> | O |
| 6 | 5 | Pulp Powder | 30 | Oxidized Starch | 15 | Hydroxyethyl-cellulose | 2 | | | 100m> | XX |

Table 2-1

| Example | Capsule Dispersion | Alkali Salts of Copolymer — Monomer Composition (Mol %): Olefinic Mono-Carboxylic Acid | | Other Vinyl Monomers | | | | Neutralizing Rate (%): NaOH | KOH | $NH_4OH$ | Amine | MgO or CaO |
|---|---|---|---|---|---|---|---|---|---|---|---|---|
| Examples | | | | | | | | | | | | |
| 11 | A | Methacrylic 60 Acid | | Butyl 40 Meth-acrylate | | | | 5 | | 95 | | |
| 12 | B | Methacrylic 50 Acid | | Butyl 30 Meth-acrylate | Acrylamide 20 | | | 40 | | 60 | | |
| 13 | B | Acrylic 30 Acid | | Butyl 30 Meth-acrylate | Acrylamide 40 | | | | | 100 | | |
| 14 | B | Methacrylic 60 Acid | | Butyl- 40 cellosolve Meth-acrylate | | | | 50 | | 45 | | CaO 5 |
| 15 | B | Acrylic 20 Acid | Crotonic 20 Acid | Methyl 40 Meth-acrylate | Octyl 20 acrylate | | | | | 90 | | MgO 10 |
| 16 | C | Acrylic 10 Acid | | Methyl 60 Acrylate | Vinyl 30 Acetate | | | | 10 | 90 | | |
| 17 | A | Acrylic 20 Acid | Ethyl 30 | Meth- 18 Acrylate | N-Methylol 2 acrylamide | Acrylo- 30 Acrylamide | 90 nitrile | | | | | |
| 18 | A | Methacrylic 70 Acid | | Octyl 30 Vinyl Ether | | | | 5 | | 95 | | |
| 19 | B | Methacrylic 60 Acid | | Butyl 40 Meth-acrylate | | | | 10 | | 60 | 30 | |
| 20 | C | Methacrylic 40 Acid | | Methyl 30 Meth-acrylate | 2-hydroxy- 30 propyl Meth-acrylate | | | 100 | | | | |
| Controls | | | | | | | | | | | | |
| 7 | A | Methacrylic 60 Acid | | Butyl 40 Meth-acrylate | | | | 5 | | 95 | | |
| 8 | A | Acrylic 40 Acid | | Butyl 20 Acrylate | Acrylamide 40 | | | 40 | | 60 | | |
| 9 | A | Acrylic 100 Acid | | | | | | | | 100 | | |
| 10 | B | Casein | | | | | | | | | | |
| 11 | B | Acrylic 30 Acid | | Butyl 60 Meth-acrylate | Styrene 10 | | | 10 | | 90 | | |
| 12 | B | Acrylic 40 Acid | | Butyl 20 Acrylate | Acrylamide 40 | | | 100 | | | | |

Table 2-2

| | Surface Tension of 1% aqueous solution of alkali salts of copolymer (dyne/cm) | Amount of Alkali Salts of Copolymer (parts) | Additives (parts) | | | | Greasing Resistance |
|---|---|---|---|---|---|---|---|
| Examples | | | | | | | |
| 11 | 55 | 15 | Pulp 40 Powder | | | | 1,000m< |
| 12 | 50 | 3 | Pulp 15 Powder | Raw 15 Starch | Oxidized 20 Starch | | 1,000m< |
| 13 | 43 | 3 | Pulp 30 Powder | Oxidized 10 Starch | Hydroxyethyl- 4 Cellulose | | 500m |
| 14 | 50 | 5 | Pulp 30 Powder | Oxidized 15 Starch | Hydroxyethyl- 2 Cellulose | | 1,000m |
| 15 | 45 | 3 | Pulp 30 Powder | Oxidized 15 Starch | Hydroxyethyl- 2 Cellulose | | 500m |
| 16 | 50 | 3 | Pulp 30 Powder | Oxidized 15 Starch | Hydroxyethyl- 2 Cellulose | | 1,000m |
| 17 | 65 | 3 | Pulp 30 Powder | Oxidized 15 Starch | Hydroxyethyl- 2 Cellulose | | 1,000m |
| 18 | 70 | 3 | Pulp 30 Powder | Oxidized 15 Starch | Hydroxyethyl- 2 Cellulose | | 1,000m< |
| 19 | 50 | 5 | Pulp 30 Powder | Oxidized 15 Starch | Hydroxyethyl- 1 Cellulose | Casein 1 | 1,000m |
| 20 | 45 | 3 | Pulp 30 Powder | Oxidized 15 Starch | Hydroxyethyl- 2 Cellulose | | 500m |
| Controls | | | | | | | |
| 7 | 35 | 3 | Pulp 30 Powder | Oxidized 15 Starch | Hydroxyethyl- 2 Cellulose | | 300m> |
| 8 | 35 | 5 | Pulp 30 Powder | Oxidized 15 Starch | Hydroxyethyl- 2 Cellulose | | 100m> |
| 9 | 65 | 3 | Pulp 30 Powder | Oxidized 15 Starch | Hydroxyethyl- 2 Cellulose | | 500m> |
| 10 | 50 | 3 | Pulp 30 Powder | Oxidized 15 Starch | Hydroxyethyl- 2 Cellulose | | 100m> |
| 11 | 38 | 3 | Pulp 30 Powder | Oxidized 15 Starch | Hydroxyethyl- 2 Cellulose | Casein 5 | 100m> |
| 12 | 35 | 10 | Pulp 30 Powder | Oxidized 15 Starch | Hydroxyethyl- 2 Cellulose | | 100m> |

What we claim is:

1. In the method for the production of a recording material comprising a base sheet and a color former coating layer formed on a surface of said base sheet, said color former coating layer including microcapsules each encapsulating a hydrophobic color former material therein, an improvement in the steps of (1) preparing an aqueous dispersion of said microcapsules each having a capsule wall of a gelated hydrophilic colloid material and containing a hydrophobic color former material therein, (2) adding to said dispersion at least one hardener for said hydrophilic colloid material selected from the group consisting of aldehydes, diketones, epoxides, acid anhydrides and acid chlorides, (3) hardening said capsule walls of said microcapsules with said hardener, (4) adding to said dispersion a water soluble alkali salt of a copolymer of 8 to 90 mol % of at least one olefinic monocarboxylic acid with 92 to 10 mol % of at least one monomer copolymerizable with said olefinic monocarboxylic acid, said water soluble alkali salt of a copolymer having a surface tension of at least 40 dyne/cm in a 1 weight % aqueous solution and the amount of said water soluble alkali salt of a copolymer included in said dispersion being within the range of 0.5 to 50 parts by weight with respect to 100 parts by weight of said hydrophobic material of said microcapsules, and (5) coating a surface of said base sheet with said coating composition to form said color former layer.

2. A method for the production of a recording material according to claim 1, in which said olefinic monocarboxylic acid is selected from the group consisting of acrylic acid, methacrylic acid and crotonic acid.

3. A method for the production of a recording material according to claim 1, in which said copolymerizable monomer is an acrylic monomer or methacrylic monomer.

4. A method for the production of a recording material according to claim 3, in which said acrylic monomer or methacrylic monomer is selected from the group consisting of alkyl acrylates having an alkyl group having 18 or less carbon atoms, alkyl methacrylate having an alkyl group having 18 or less carbon atoms, acrylonitrile, methacrylonitrile, acrylamide and methacrylamide.

5. A method for the production of a recording material according to claim 3, in which said hydrophilic colloid material is gelatin.

6. A method for the production of a recording material according to claim 1, in which said water soluble alkali salt of copolymer has a surface tension of 45 to 72 dyne/cm in a 1 weight % aqueous solution.

7. A recording material comprising a base sheet and a color former coating layer formed on a surface of said base sheet said color former coating layer including microcapsules each encapsulating a hydrophobic color former material therein, said recording material produced by the steps of:

a. preparing an aqueous dispersion of said microcapsules each having a capsule wall of a gelated hydrophilic colloid material and containing a hydrophobic color former material therein;

b. adding to said dispersion at least one hardener for said hydrophillic colloid material selected from the group consisting of aldehydes, diketones, epoxides, acid anhydrides and acid chlorides;

c. hardening said capsule walls of said microcapsules with said hardener;

d. adding to said dispersion a water soluble alkali-salt of a copolymer of 8 to 90 mol percent of at least one olefinic monocarboxylic acid with 92 to 10 mol percent of at least one monomer copolymerizable with said olefinic monocarboxylic acid to form a coating composition, said water soluble alkali salt of a copolymer having a surface tension of at least 40 dyne/cm in a 1 weight percent aqueous solution, the amount of said water soluble alkali salt of a copolymer included in said dispersion being within the range of 0.5 to 50 parts by weight with respect to 100 parts by weight of said hydrophobic material of said microcapsules; and e. coating a surface of said base sheet with said coating composition to form said color former layer.

8. A recording material according to claim 7, in which said olefinic monocarboxylic acid is selected from the group consisting of acrylic acid, methacrylic acid and crotonic acid.

9. A recording material according to claim 7, in which said copolymerizable monomer is an acrylic monomer or methacrylic monomer.

10. A recording material according to claim 9, in which said acrylic monomer or methacrylic monomer is selected from the group consisting of alkyl acrylates having an alkyl group having 18 or less carbon atoms, alkyl methacrylate having an alkyl group having 18 or less carbon atoms, acrylonitrile, methacrylonitrile, acrylamide and methacrylamide.

11. A recording material according to claim 7, in which said hydrophilic colloid material is gelatin.

12. A recording material according to claim 7, in which said water soluble alkali salt of a copolymer has a surface tension of 45 to 72 dyne/cm in a 1 weight % aqueous solution.

* * * * *